(12) United States Patent
Ebe

(10) Patent No.: US 6,222,997 B1
(45) Date of Patent: Apr. 24, 2001

(54) CAMERA

(75) Inventor: Akihiko Ebe, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/439,570

(22) Filed: Nov. 12, 1999

(30) Foreign Application Priority Data

Nov. 20, 1998 (JP) .................................................. 10-331328

(51) Int. Cl.$^7$ .............................. G03B 15/05; G03B 17/04
(52) U.S. Cl. ............................................ 396/177; 396/349
(58) Field of Search .................................... 396/177, 178, 396/176, 349

(56) References Cited

U.S. PATENT DOCUMENTS 5,749,003 * 5/1998 Tanabe ................................. 396/177

* cited by examiner

Primary Examiner—W.B Perkey
(74) Attorney, Agent, or Firm—Robin Blecker & Daley

(57) ABSTRACT

A camera includes a lens barrel arranged to be movable between a non-photo-taking position and a photo-taking position, a flash device arranged to be movable between a stowage position and a usage position, an interlocking mechanism arranged to move the flash device from the stowage position to the usage position in association with movement of the lens barrel from the non-photo-taking position to the photo-taking position and to move the flash device from the usage position to the stowage position in association with movement of the lens barrel from the photo-taking position to the non-photo-taking position, and a toggle spring arranged to give the flash device an urging force toward the stowage position when the flash device is located in the vicinity of the stowage position and to give the flash device an urging force toward the usage position when the flash device is located in the vicinity of the usage position.

9 Claims, 6 Drawing Sheets

PHOTO-TAKING OPTICAL AXIS

CAMERA

BACKGROUND OF THE INVENTION

1. Field of the Invention

The present invention relates to a camera having an electronic flash device, and more particularly to a camera arranged such that an electronic flash device moves to a light emission position at the time of photo-taking and to a stowage position at the time of non-photo-taking in association with drawing-out and drawing-in of a movable lens barrel.

2. Description of Related Art

Compact cameras each having a built-in electronic flash device (hereinafter referred to as the flash device) are arranged to mechanically pop up the flash device in such a direction as to move the flash device away from the optical axis of a photo-taking lens, or to rotate and lift up the flash device in a retractable manner, for the purpose of avoiding a red-eye phenomenon. Some of these cameras are arranged to move a lens barrel from a non-photo-taking position to a photo-taking position. In the case of such a camera, the flash device is stowed when the lens barrel is in the non-photo-taking position, and the flash device is moved to a light emission position when the camera is in the photo-taking position. In other words, the camera is arranged to have a retractable flash device interlocked with a movable lens barrel. Hereinafter, the camera of this type is called a movable-lens-barrel interlocked type camera.

The movable-lens-barrel interlocked type camera obviates the necessity of having an actuator for moving the flash device. The flash device can be automatically moved, in association with the movement of the lens barrel, from the light emission position to the stowage position simply by an on-off operation on a main switch of the camera. This flash device arrangement is suited to compact cameras for which reduction in size is mandatory.

Examples of the movable-lens-barrel interlocked type camera have been disclosed in Japanese Laid-Open Patent Applications No. HEI 8-110552 and No. HEI 9-105982 (corresponding to U.S. Pat. No. 5,749,003). The camera of this type is arranged to urge the flash device with a spring toward the stowage position. The camera is thus arranged to have the flash device moved against the urging force of the spring by the movement of the movable lens barrel from the non-photo-taking position to the photo-taking position. In some of the cameras of this type, the flash device is arranged to be conversely moved. In other words, the flash device is arranged to be urged by a spring toward the light emission position and to move against the urging force toward the stowage position when the lens barrel is moved from the photo-taking position to the non-photo-taking position.

BRIEF SUMMARY OF THE INVENTION

In accordance with one aspect of the invention, there is provided a camera comprising a lens barrel arranged to be movable between a non-photo-taking position and a photo-taking position, a flash device arranged to be movable between a stowage position and a usage position, an interlocking mechanism arranged to move the flash device from the stowage position to the usage position in association with movement of the lens barrel from the non-photo-taking position to the photo-taking position and to move the flash device from the usage position to the stowage position in association with movement of the lens barrel from the photo-taking position to the non-photo-taking position, and a toggle spring arranged to give the flash device an urging force toward the stowage position when the flash device is located in the vicinity of the stowage position and to give the flash device an urging force toward the usage position when the flash device is located in the vicinity of the usage position, so that the flash device can be held without fail either in the stowage position or in the usage position.

The above and other objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

(First Embodiment)

Figure 1:
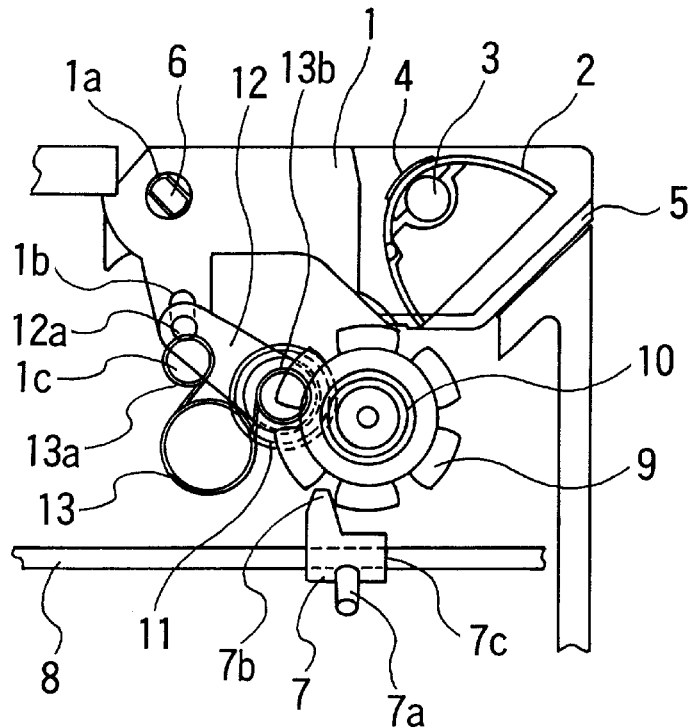
FIG. 1 is a sectional view showing the essential parts of a camera when a flash device is in a stowage position, according to a first embodiment of the invention.
Figure 2:
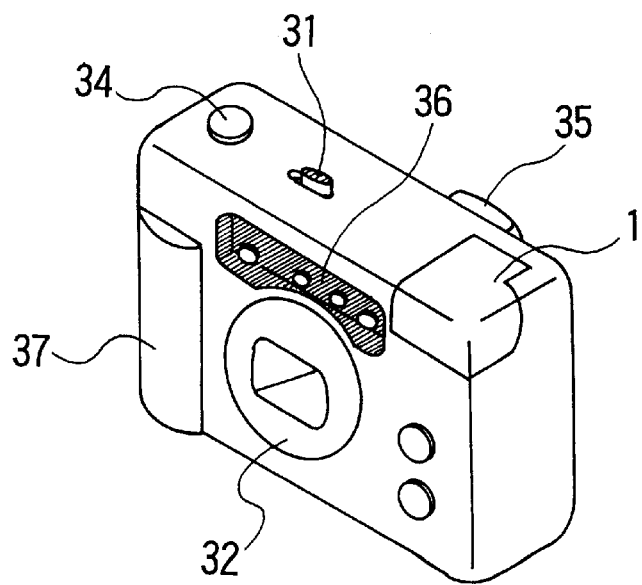
FIG. 2 is a perspective view showing the appearance of the camera when the flash device is in the stowage position, according to the first embodiment of the invention.
Figure 3:
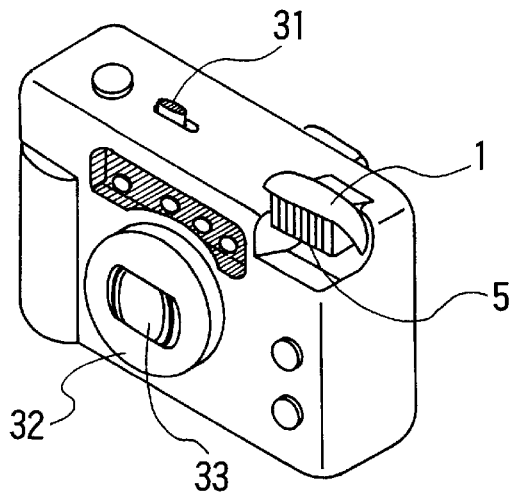
FIG. 3 is a perspective view showing the appearance of the camera when the flash device is in a light emission position, according to the first embodiment of the invention.

FIG. 1 is a sectional view showing the essential parts of a camera when a flash device is in a stowage position, according to a first embodiment of the invention. FIGS. 2 and 3 are perspective views respectively showing the appearance of the camera when the flash device in the stowage position and when the flash device is a light emission position.

In FIGS. 2 and 3, reference numeral 1 denotes a flash-device holder, and reference numeral 31 denotes an operation knob which is interlocked with a main switch of the camera. In the position of the operation knob 31 shown in FIG. 2, the main switch is in an off-state, so that a movable lens barrel 32 is in a non-photo-taking position. In the position of the operation knob 31 shown in FIG. 3, the main switch is in an on-state, so that the movable lens barrel 32 is in a photo-taking position, and a lens 33 is exposed to the outside. Further, in the state shown in FIG. 3, the flash-device holder 1, which serves as main body of the flash device, is in a state of having been turned upward to have its light emitting surface directed frontward (toward an object of shooting). Reference numeral 34 denotes a shutter button, reference numeral 35 denotes a viewfinder, reference numeral 36 denotes a light-and-distance measuring part, and reference numeral 37 denotes a grip part.

In FIG. 1, there are illustrated the flash-device holder 1, a reflector 2, a xenon lamp 3 which is a flash light emission lamp, a xenon-lamp mounting rubber 4 arranged to pull the xenon lamp 3 toward the reflector 2, and a flash-device protector 5 which is made of a transparent material. These parts are all disposed within the flash-device holder 1. The flash-device holder 1 is mounted on a rotation shaft 6 to be turnable around a rotation center 1a approximately perpendicular to a photo-taking optical axis of the camera. The rotation shaft 6 is supported by an internal part of a camera body (not shown).

A moving member 7 is arranged to move in association with the movement of the movable lens barrel 32. The moving member 7 is provided with a pin 7a, an engaging part 7b and a fitting engagement hole 7c. A guide bar 8 is arranged to guide the moving member 7 and is fitted into the fitting engagement hole 7c of the moving member 7. The moving member 7 is thus arranged to be laterally movable (to the right and left), as viewed in FIG. 1, under the guidance of the guide bar 8 in association with the movement of the movable lens barrel 32. A first driving gear 10 is arranged to rotate integrally with a flash-device driving rotary plate 9. A second driving gear 11 engages the first driving gear 10 and is arranged to rotate integrally with a driving lever 12 while the center of rotation thereof kept coincident with that of the driving lever 12. The driving lever 12 has a driving lever pin 12a at its fore end part. The driving lever pin 12a is fitted into a driving guide slot 1b formed in the flash-device holder 1. When the driving lever 12 rotates, the flash-device holder 1 rotates around the rotation center 1a. A toggle spring 13 is arranged to urge the flash-device holder 1 toward the light emission position when the flash-device holder 1 is located in the vicinity of the light emission position and to urge the flash-device holder 1 toward the stowage position when the flash-device holder 1 is in the vicinity of the stowage position. The toggle spring 13 has a hook part 13a at its one end. The hook part 13a engages a fore end part 1c of the driving guide slot 1b of the flash-device holder 1. Another hook part 13b, which is provided at the other end of the toggle spring 13, engages the rotation center part of the driving gear 11 and that of the driving lever 12.

Figure 4:
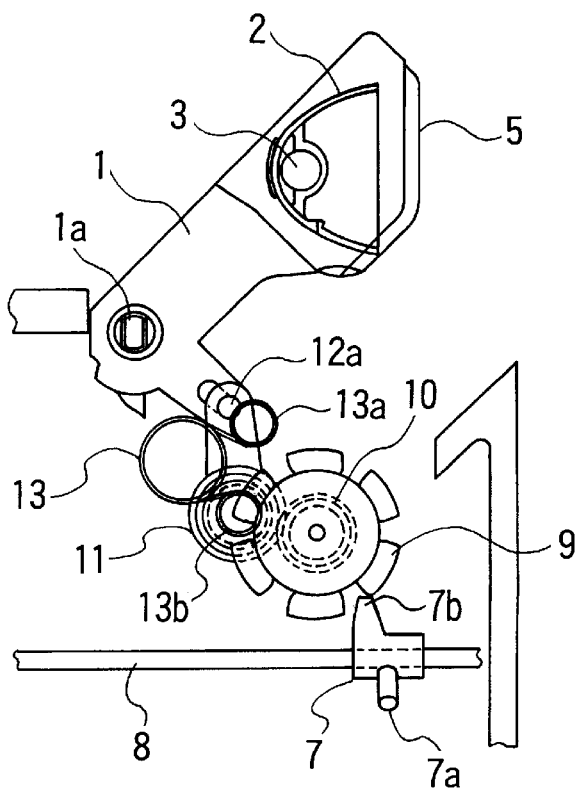
FIG. 4 is a sectional view showing the essential parts of the camera when the flash device is in the light emission position with a flash-device holder turned from the state shown in FIG. 1.

FIG. 4 is a sectional view showing the flash-device holder 1 in a state of having come to the light emission position by turning from the state shown in FIG. 1. The operation of the camera arranged as shown in FIG. 1 in the first embodiment is next described below with reference to FIGS. 1 and 4.

When the moving member 7 shown in FIG. 1 moves rightward, the flash-device driving rotary plate 9 is driven by the engaging part 7b of the moving member 7 to rotate counterclockwise to an extent corresponding to one tooth, thereby bringing about a state shown in FIG. 4. In the state shown in FIG. 4, the movable lens barrel 32 is in the photo-taking position. If the camera has a zoom lens mounted thereon, the movable lens barrel 32 is at one of photo-taking positions between the wide-angle end and the telephoto end. The moving member 7 does not move when the movable lens barrel 32 is within this photo-taking area.

When the flash-device driving rotary plate 9 rotates, the driving gear 10, which is mounted integrally with the flash-device driving rotary plate 9, also rotates counterclockwise to cause the driving gear 11 to rotate clockwise. The driving lever 12, which is mounted integrally with the driving gear 11, also rotates clockwise. Then, the fitting engagement of the driving pin 12a with the driving guide slot 1b causes the flash-device holder 1 to turn counterclockwise around the rotation center 1a, thereby bringing about the state shown in FIG. 4.

The toggle spring 13 is arranged to give the flash-device holder 1 an urging force toward the stowage position when the toggle spring 13 is in the vicinity of the stowage position and to give the flash-device holder 1 an urging force toward the light emission position when the toggle spring 13 is in the vicinity of the light emission position. Therefore, even if the pin 7a of the moving member 7 comes to disengage from the teeth of the flash-device driving rotary plate 9 when the flash-device holder 1 is located either at the stowage position or at the light emission position, the flash-device holder 1 can be kept at the stowage position or at the light emission position by the urging force of the toggle spring 13. By virtue of this arrangement, no load is imposed on the movable lens barrel 32 when the flash device is either in the stowage position or in the light-emitting position.

Figure 5:
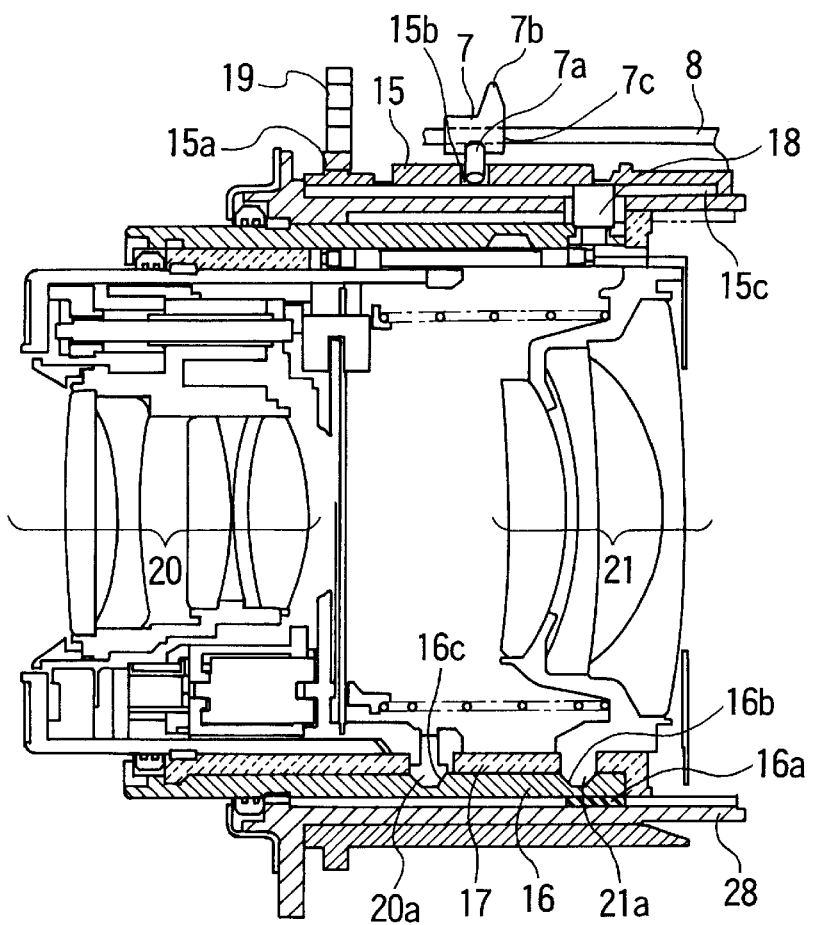
FIG. 5 is a sectional view of a photo-taking lens taken along a photo-taking optical axis.

The movement of the moving member 7 is described below with reference to FIGS. 5 and 6. FIG. 5 is a sectional view of the photo-taking lens taken along a photo-taking optical axis thereof.

Referring to FIG. 5, a driving tube 15 has a driving gear 15a formed on its outer side and a rectilinear motion groove 15c formed on its inner side. The driving tube 15 is arranged to be rotated by a driving motor (not shown) with its rotating force transmitted through a reduction gear system including a final reduction gear 19. The rotating force of the driving tube 15 is transmitted to a cam tube 16 through a transmission shaft 18. The cam tube 16 has a helicoid 16a on its outer side and cam grooves 16b and 16c formed on its inner side. The cam tube 16 is thus arranged to move back and forth in the direction of the optical axis while rotating according to the lead of the helicoid 16a. A fixed tube 28 has, on its inner side, a helicoid and a cam groove which allows the transmission shaft 18 to move. A rectilinear motion tube 17 has a rectilinear motion groove formed therein and is arranged to linearly move integrally with the cam tube 16. First and second lens groups 20 and 21 form the photo-taking lens. When the cam tube 16 rotates, the engagement of the cam groove 16c of the cam tube 16 with a pin 20a of the first lens group 20 and the engagement of the cam groove 16b with a pin 21a of the second lens group 21 enable the first and second lens groups 20 and 21 to move back and forth in the direction of the optical axis. The driving tube 15 is provided with a cam groove 15b formed on its outer side for driving the flash device. The pin 7a of the moving member 7 engages the cam groove 15b of the driving tube 15.

Figure 6:
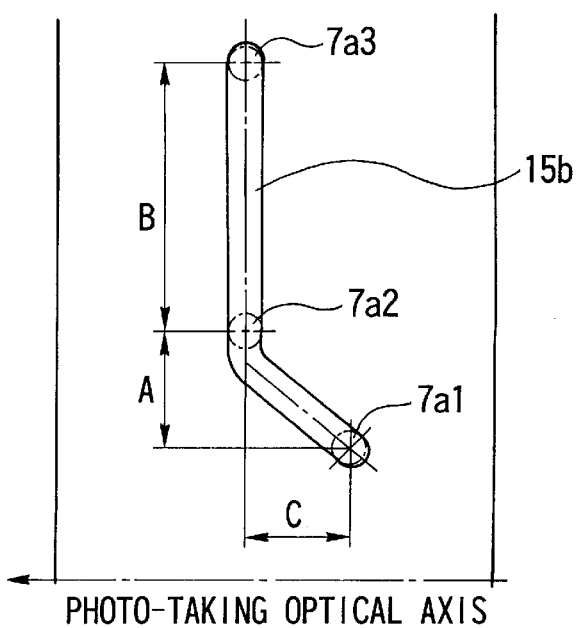
FIG. 6 is a plan view showing, in a developed state, a cam groove used for driving the flash device.

FIG. 6 is a development view of the cam groove 15b provided in the driving tube 15 for driving the flash device. In FIG. 6, the position 7a1 represents the stowage position, the position 7a2 represents the wide-angle end position of the photo-taking lens, and the position 7a3 represents the telephoto end of the photo-taking lens. Therefore, reference symbol A denotes a non-photo-taking area, and reference symbol B denotes a photo-taking area. Further, reference symbol C denotes the amount of movement of the moving member 7. Thus, the moving member 7 is allowed to move only within a distance from the stowage position to the wide-angle end. In other words, the cam groove 15b is arranged to inhibit the moving member 7 from moving in the photo-taking area B.

(Second Embodiment)

A second embodiment of the invention is next described. In the second embodiment, the flash-device driving rotary plate 9 and the driving gear 10 in the first embodiment shown in FIG. 4 are improved. With the exception of these parts, all other parts of the second embodiment are the same as those of the first embodiment. The details of the improved parts are described below with reference to FIGS. 7 and 8.

Figure 7:
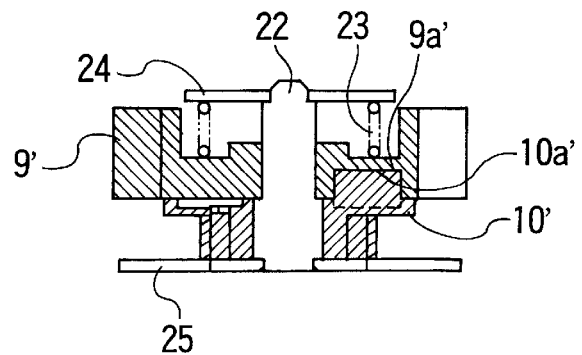
FIG. 7 is a longitudinal sectional view showing a flash-device driving rotary plate and a driving gear in a camera according to a second embodiment of the invention.
Figure 8:
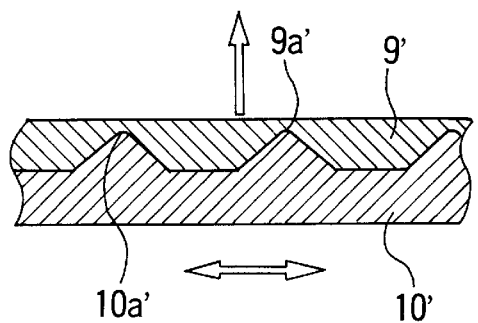
FIG. 8 is a sectional view showing in detail the cam portions of the flash-device driving rotary plate and the driving gear shown in FIG. 7, which are put together in the vertical direction.

FIG. 7 is a longitudinal section of a flash-device driving rotary plate 9' and a driving gear 10' in the second embodiment. FIG. 8 shows in detail a cam portion where the flash-device driving rotary plate 9' and the driving gear 10' are put together in their vertical direction. In FIG. 7, there are illustrated a rotation shaft 22, a compression spring 23, a keep plate 24, and a base plate 25. The flash-device driving rotary plate 9' and the driving gear 10' are held in position between the keep plate 24 and the base plate 25. The flash-device driving rotary plate 9' has a cam groove 9a', while the driving gear 10' has a cam ridge 10a'. When a strong force is exerted in the direction of rotation either on the flash-device driving rotary plate 9' or on the driving gear 10', the flash-device driving rotary plate 9' or the driving gear 10' is caused to part from the other against the spring force of the compression spring 23, and then rotates to bring the next cam groove 9a' to the position of the cam ridge 10a'. The flash-device driving rotary plate 9' and the driving gear 10' then again come into tight contact with each other.

Figure 9:
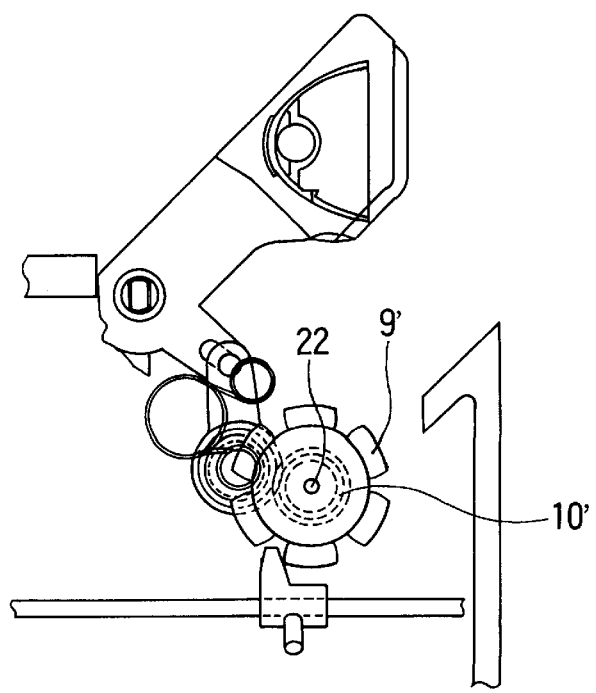
FIG. 9 is a sectional view showing the state in which the flash-device holder is in the light emission position although the lens barrel is in a non-photo-taking position.

Next, the phase of the flash-device driving rotary plate 9' is described with reference to FIGS. 9 and 10. In the second embodiment, the position of teeth of the flash-device driving rotary plate 9' is set in such a way as to be the same in both cases where the moving member 7 is located at a position corresponding to the non-photo-taking position of the movable lens barrel 32 and where the moving member 7 is at a position corresponding to the photo-taking position of the movable lens barrel 32.

Next, the operation of the second embodiment is described. FIG. 9 shows the state in which the flash-device holder 1 is in the light emission position although the movable lens barrel 32 is at the non-photo-taking position. To bring the state of FIG. 1 into the state of FIG. 9, the flash-device holder 1 is first manually rotated counterclockwise by the user from the state of FIG. 1. Then, a force of rotating the flash-device driving rotary plate 9' counterclockwise is exerted on the engaging part 7b of the moving member 7. However, since the moving member 7 cannot be moved, the flash-device driving rotary plate 9' is not allowed to rotate. Then, the disconnecting mechanism described above with reference to FIG. 7 acts to cause the flash-device driving rotary plate 9' to temporarily part from the driving gear 10'. The temporary parting allows the driving gear 10' to rotate alone. As a result, the flash-device holder 1 comes to assume the light emission position as shown in FIG. 9. In other words, when the flash-device holder 1 is manually operated, the operating force acts on the driving lever 12 and the driving gear 10' to move the flash-device holder 1 from the light emission position toward the stowage position. Then, since the driving gear 10' and the flash-device driving rotary plate 9' are disconnected at that time, the flash-device holder 1 can be moved irrespective of the position of the movable lens barrel 32.

Figure 10:
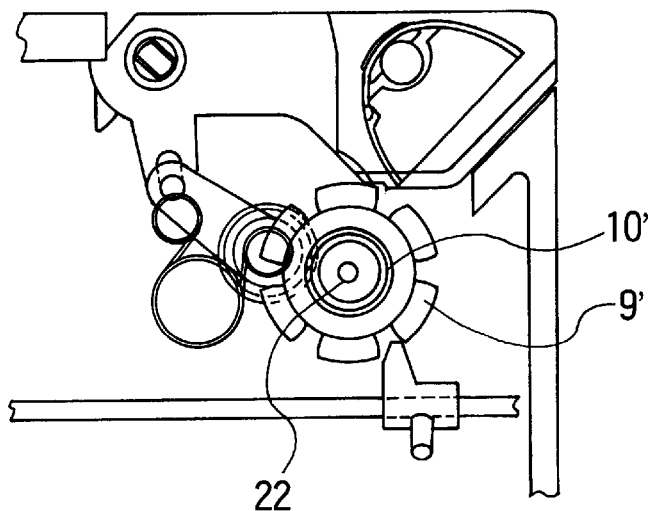
FIG. 10 is a sectional view showing the state in which the flash-device holder is in the stowage position although the lens barrel is in a photo-taking position.

FIG. 10 shows the state in which with the flash-device holder 1 has been pushed down to the stowage position although the movable lens barrel 32 is in the photo-taking position. To obtain the state of FIG. 10, the flash-device holder 1 is manually pushed down from the state of FIG. 4 by the user. The discrepancy in position between the flash-device holder 1 and the movable lens barrel 32 is obtained by disconnecting the driving gear 10' from the flash-device driving rotary plate 9'. The position of the movable lens barrel 32 can be shifted from the state of FIG. 9 to the photo-taking position and from the state of FIG. 10 to the non-photo-taking position also by disconnecting the driving gear 10' and the flash-device driving rotary plate 9' from each other.

With the second embodiment arranged in the above manner, in a case where the flash-device holder 1 is manually moved from the light emission position toward the stowage position or from the stowage position toward the light emission position, the driving gear 10' and the flash-device driving rotary plate 9', which are linked to the flash-device holder 1, are disconnected from each other. Therefore, in this case, the flash-device holder 1 can be kept at the light emission position or at the stowage position by virtue of the action of the urging member 13, i.e., the toggle spring 13, irrespective of the position of the movable lens barrel 32. At this time, the relative positions of the moving member 7 and the flash-device driving rotary plate 9' remain unchanged. For example, when the flash-device holder 1 is manually pushed down from the light emission position while the movable lend barrel 32 is in the photo-taking position, the driving gear 10' is disconnected from the flash-device driving rotary plate 9' to cause no change in the positional relation between the flash-device driving rotary plate 9' and the moving member 7. Therefore, when the movable lens barrel 32 is shifted in this state to the non-photo-taking position, although the moving member 7 causes the flash-device driving rotary plate 9' to rotate, the driving gear 10' and the flash-device driving rotary plate 9' are also disconnected from each other to allow the flash-device driving rotary plate 9' to rotate, so that the movable lens barrel 32 can be moved up to the non-photo-taking position. Further, also in a case where the flash-device holder 1 is manually lifted up by the user from the stowage position to the light emission position while the movable lens barrel 32 is in the non-photo-taking position, the driving gear 10' and the flash-device driving rotary plate 9' are disconnected from each other. Therefore, in that case also, a positional relation between the flash-device driving rotary plate 9' and the driving gear 10' remains unchanged, although the flash-device holder 1 is moved by the urging member 13 to the light emission position. Hence, when the movable lens barrel 32 is moved from this state to the photo-taking position, the moving member 7 causes the flash-device driving rotary plate 9' to rotate. However, since the driving gear 10' is disconnected from the flash-device driving rotary plate 9', the flash-device driving rotary plate 9' rotates alone to allow the movable lens barrel 32 to be moved up to the photo-taking position.

Further, in a case where the flash-device holder 1 is manually lifted from the stowage position up to the light emission position by the user while the movable lens barrel 32 is in the photo-taking position, the driving gear 10' and the flash-device driving rotary plate 9' are also disconnected from each other. Therefore, the flash-device holder 1 is moved by the urging member 13 to the light emission position while there is no change in the positional relation of the flash-device driving rotary plate 9' and the moving member 7. When the movable lens barrel 32 is moved to the non-photo-taking position from this state, therefore, the moving member 7 causes the flash-device driving rotary plate 9' to rotate. However, since the driving gear 10' and the flash-device driving rotary plate 9' are then disconnected from each other, the flash-device driving rotary plate 9' rotates alone to allow the movable lens barrel 32 to be moved up to the non-photo-taking position.

(Third Embodiment)

A camera according to a third embodiment of the invention is next described. All the parts of the third embodiment that are the same as those of the first embodiment are denoted by the same reference numerals as used in the first embodiment.

Figure 11:
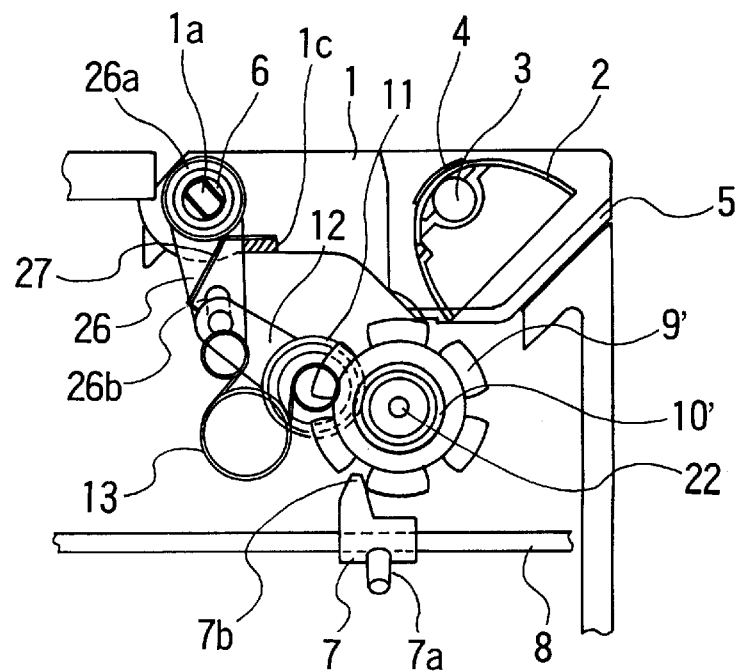
FIG. 11 is a sectional view showing the essential parts of a camera when a flash device is in a stowage position, according to a third embodiment of the invention.

Referring to FIG. 11, a connection lever 26 is connected to the flash-device holder 1. A torsion spring 27 is hung between the connection lever 26 and the flash-device holder 1. The connection lever 26 is caused to abut on the projection 1c of the flash-device holder 1 by the urging force of the torsion spring 27. The spring force of the torsion spring 27 is set to be weaker than that of the toggle spring (urging member) 13. Therefore, even if the flash-device holder 1 is manually lifted up alone toward the light emission position from the state of FIG. 11, while keeping the movable lens barrel 32 in the non-photo-taking position, the flash-device holder 1 cannot be kept in the light emission position, although the projection 1c of the flash-device holder 1 parts from the connection lever 26 against the urging force of the torsion spring 27.

Figure 12:
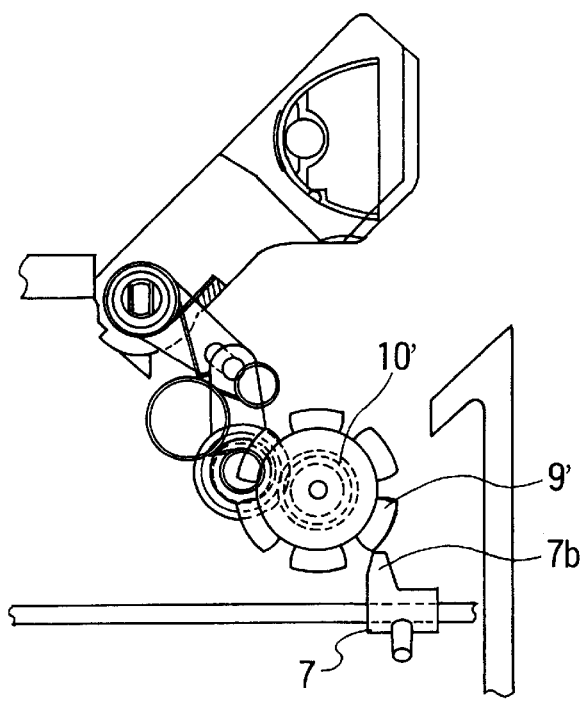
FIG. 12 is a sectional view showing the essential parts of the camera when a movable lens barrel is in a photo-taking position in the third embodiment of the invention.
Figure 13:
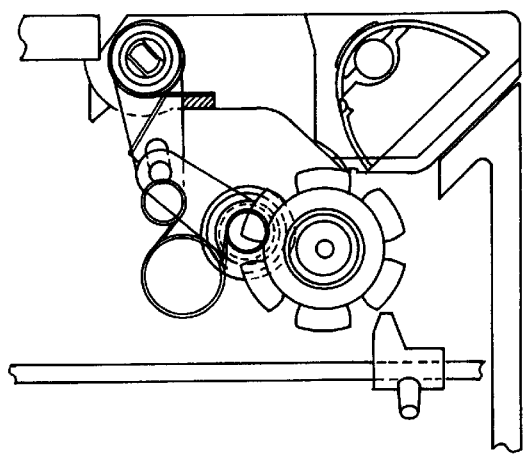
FIG. 13 is a sectional view showing the essential parts of the camera when a flash-device holder has been turned from the state shown in FIG. 12.
Figure 14:
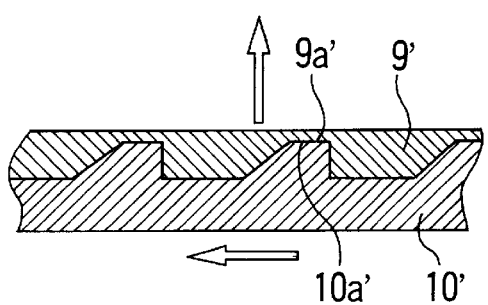
FIG. 14 is a sectional view showing a connected state a flash-device driving rotary plate and a driving gear when the movable lens barrel is about to move from the state shown in FIG. 13 to a non-photo-taking position.

FIG. 12 shows the state obtained when the movable lens barrel 32 is set in the photo-taking position. In this state, the engaging part 7b of the moving member 7 is disengaged and is away from the teeth of the flash-device driving rotary plate 9'. This state can be obtained by changing the shape of the cam groove 15b described in the foregoing with reference to FIG. 6, that is, by increasing the distance C shown in FIG. 6. When the flash-device holder 1 is turned (lowered) from the state of FIG. 12 to a state shown in FIG. 13, the flash-device holder 1 can be pushed down without disconnecting the driving gear 10' and the flash-device driving rotary plate 9' from each other. Further, in moving the movable lens barrel 32 from the state of FIG. 13 to the non-photo-taking position, the flash-device driving rotary plate 9' and the driving gear 10' are disconnected from each other by a disconnecting mechanism shown in FIG. 14. Unlike the arrangement shown in FIG. 8, the disconnecting mechanism shown in FIG. 14 has a cam ridge and a cam root arranged to permit rotation only in one direction in a simple cam shape.

What is claimed is:

1. A camera comprising:

a) a lens barrel arranged to be movable between a non-photo-taking position and a photo-taking position;

b) a flash device arranged to be movable between a stowage position and a usage position;

c) an interlocking mechanism arranged to move said flash device from the stowage position to the usage position in association with movement of said lens barrel from the non-photo-taking position to the photo-taking position and to move said flash device from the usage position to the stowage position in association with movement of said lens barrel from the photo-taking position to the non-photo-taking position; and d) a toggle spring arranged to give said flash device an urging force toward the stowage position when said flash device is located in the vicinity of the stowage position and to give said flash device an urging force toward the usage position when said flash device is located in the vicinity of the usage position.

2. A camera according to claim 1, wherein, when said flash device is in the stowage position or in the usage position, said flash device and said interlocking mechanism disengage from each other.

3. A camera according to claim 1, wherein said interlocking mechanism includes a first member which is engageable with said lens barrel, a second member which is engageable with said flash device, and a clutch mechanism which disconnects said first member and said second member from each other.

4. A camera according to claim 3, wherein said clutch mechanism disconnects said first member and said second member from each other when said flash device is manually operated.

5. A camera according to claim 3, wherein said clutch mechanism connects said first member and said second member to each other when said lens barrel is in the non-photo-taking position and when said lens barrel is in the photo-taking position.

6. A camera according to claim 3, wherein said clutch mechanism connects said first member and said second member to each other when said flash device is in the stowage position and when said flash device is in the usage position.

7. A camera according to claim 1, wherein said interlocking mechanism includes a cam tube for driving said lens barrel, and a moving member having a pin which engages a cam formed in said cam tube and arranged to move in the direction of an optical axis in association with rotation of said cam tube.

8. A camera according to claim 1, wherein said interlocking mechanism includes a rotary member which is arranged such that a rotation phase thereof obtained when said lens barrel is in the non-photo-taking position is the same as a rotation phase thereof obtained when said lens barrel is in the photo-taking position.

9. A camera according to claim 1, wherein said flash device and said interlocking mechanism are connected to each other through a spring.

* * * * *